United States Patent Office 2,884,465
Patented Apr. 28, 1959

2,884,465

PREPARATION OF PARA, BETA-DINITROSTYRENE

Samuel W. Tinsley, South Charleston, W. Va., assignor to Union Carbide Corporation, a corporation of New York No Drawing. Application May 3, 1957
Serial No. 656,751

4 Claims. (Cl. 260—645)

This invention relates to a process for the preparation of para, beta-dinitrostyrene. More particularly, this invention relates to a process for the preparation of para, beta-dinitrostyrene from 1-(para-nitrophenyl) ethyl nitrate by the action of concentrated sulfuric acid.

According to the present invention, para, beta-dinitrostyrene can be prepared from 1-(para-nitrophenyl) ethyl nitrate by the action of concentrated sulfuric acid according to the folowing scheme:

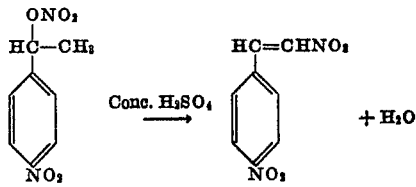

This process represents a rather unusual intermolecular nitration reaction wherein the nitrate ester group of an alpha-carbon atom has been converted to a nitro group on a beta-carbon atom.

The reaction of this process is carried out in solution by dissolving the 1-(para-nitrophenyl) ethyl nitrate in concentrated sulfuric acid at a rate so as to maintain a temperature below about 80° C. The reaction of the 1-(para-nitrophenyl) ethyl nitrate to the para, beta-dinitrostyrene is quite exothermic and temperature control over the process must be maintained below about 80° C. Temperatures above about 80° C. foster hydrolysis of the para, beta-dinitrostyrene and are thus to be avoided. Preferably, the reaction is conducted at a temperature between about 0° C. and 80° C., with a temperature of about 40° C. considered optimum to secure the best yield of the para, beta-dinitrostyrene. At temperatures about the lower temperature limit, dissolution rate of the 1-(para-nitrophenyl) ethyl nitrate in the sulfuric acid is slow and time consumed in the reaction is greatly lengthened.

Temperature control over the reaction can be maintained in any desired manner, such as by the slow controlled addition of the 1-(para-nitrophenyl) ethyl nitrate to the sulfuric acid, or by having the reactor equipped with internal or external cooling means to remove the exothermic heat. The slow addition of the 1-(para-nitriphenyl) ethyl nitrate to the sulfuric acid as a means to control the rate of reaction, and thus the rate of evolution of the exothermic heat, is preferred in batch operation for the sake of simplicity and safety. However, the use of cooling means such as an external coolant jacket or internal cooling coils to maintain the desired reaction temperature is more applicable to a continuous process.

In the continuous operation of this process, the sulfuric acid and the 1-(para-nitrophenyl) ethyl nitrate can be continuously added to a reactor in amounts found adequate to maintain control over the reaction, while continuously withdrawing a portion of the reaction mixture to recover the para, beta-dinitrostyrene produced therein.

The sulfuric acid is required in this process to serve both as a solvent for the 1-(para-nitrophenyl) ethyl nitrate and as a dehydrating agent. Generally amounts of at least five to ten parts by weight of sulfuric acid per part of 1-(para-nitrophenyl) ethyl nitrate are desired to secure good yields of the para, beta-dinitrostyrene. However, the slow addition of the 1-(para-nitrophenyl) ethyl nitrate to the concentrated sulfuric acid essentially accomplishes this result even when the sulfuric acid is employed in lesser amounts. In batch operation, amounts of about three parts of acid per part of 1-(para-nitrophenyl) ethyl nitrate is necessary to secure respectable yields of the para, beta-dinitrostyrene.

Concentrated sulfuric acid is necessary in this process, preferably the commercial (96 percent) concentrated acid. Acid of at least 70 percent strength can be used; however, when acid of such strength is used, considerably larger quantities should be employed. Weaker strength acids apparently do not have sufficient dehydrating activity to cause the reaction. Similarly, only sulfuric acid has been found to facilitate the reaction.

Pressure is not critical in the reaction. While the reaction is conveniently conducted at atmospheric pressure, either sub-atmospheric or super-atmospheric pressures can be employed if desired.

The para, beta-dinitrostyrene prepared by this reaction is easily recovered by quenching the reaction mixture in cold water or over ice. Neutralizing the acid to a pH of about 7 to 8 with a base causes the para, beta-dinitrostyrene to precipitate in the quenched solution, after which the precipitate can be filtered off and washed with water to remove impurities. Ammonium hydroxide serves conveniently as the neutralizing medium although any other base can be conveniently employed. If desired, the para, beta-dinitrostyrene can be recrystallized from an organic solvent in which the para, beta-dinitrostyrene is not soluble, such as benzene, methanol, dioxane, and the like to improve the purity.

Good yields of the para, beta-dinitrostyrene are possible by this process. Under the preferred conditions yields of 96–98 percent are possible. However, such factors as high temperatures, low strength acid, recovery methods, etc., can materially affect the yield of the product.

The following examples are illustrative.

*Example 1*

To 500 grams of 96 percent (concentrated) sulfuric acid maintained at 40° C., there was slowly added with stirring, 50 grams of 1-(para-nitrophenyl) ethyl nitrate over a period of 30 minutes. The temperature of the reaction mixture was maintained at about 40° C. during the addition. Stirring was continued for 5–10 minutes until all the ethyl nitrate had dissolved. Thereafter, the reaction mixture was poured onto ice and neutralized to a pH of about 7–8 with 28 percent ammonium hydroxide solution. A precipitate formed which was filtered from the solution and washed with water. The crystalline precipitate was dissolved in benzene and recrystallized from this solution to give 20 grams of a white crystalline matter identified as para, beta-dinitrostyrene, which had a melting point of 180° C.–200° C. This amounts to a yield of about 44 percent by weight of the theoretical. A second recrystallization of the para, beta-dinitrostyrene from benzene gave pure white crystals having a melting point of 200° C. The reported melting point of para, beta-dinitrostyrene is 196° C.–199° C. according to Ber., 32, 1293 (1899).

*Example 2*

To 1000 grams of 96 percent (concentrated) sulfuric acid maintained at 40° C. there was slowly added with stirring over a period of 60 minutes, 100 grams of 1-

(para-nitrophenyl) ethyl nitrate which had been recrystallized from methanol. The temperature of the reaction mixture was maintained at 40° C. during the addition. Stirring was continued for 5–10 minutes until all the ethyl nitrate had dissolved. Thereafter the mixture was poured onto crushed ice. The diluted mixture was kept cold and neutralized to a pH of about 8 with 28 percent ammonium hydroxide solution. The precipitate formed was filtered from the solution and washed with water. There was recovered 88 grams of crude para, beta-dinitrostyrene having a melting point of 185° C.–190° C. This amounted to a yield of 96 percent of theoretical. A recrystallization from dioxane gave pure para, beta-dinitrostyrene having a melting point of 201° C.

What is claimed is:

1. A process for the preparation of para, beta-dinitrostyrene which includes the steps of dissolving 1-(para-nitrophenyl) ethyl nitrate in concentrated sulfuric acid of a strength of at least 70 percent, maintaining the temperature greater than 0° C. and below about 80° C. and thereafter recovering the para, beta-dinitrostyrene thus produced.

2. A process for the preparation of para, beta-dinitrostyrene which includes the steps of slowly adding and dissolving 1-(para-nitrophenyl) ethyl nitrate in concentrated sulfuric acid of a strength greater than 70 percent while maintaining the temperature between about 20° C. and 80° C. and thereafter recovering the para, beta-dinitrostyrene thus produced.

3. A process for the preparation of para, beta-dinitrostyrene which includes the steps of slowly adding and dissolving 1-(para-nitrophenyl) ethyl nitrate in concentrated sulfuric acid of a strength greater than 70 percent, maintained at a temperature between 0° C. and about 80° C. with at least 3 parts by weight of sulfuric acid per part of 1-(para-nitrophenyl) ethyl nitrate in the reaction mixture, and quenching the reaction mixture and neutralizing the said reaction mixture to recover the para, beta-dinitrostyrene.

4. A process for the preparation of para, beta-dinitrostyrene which includes the steps of slowly adding and dissolving 1-(para-nitrophenyl) ethyl nitrate in commercial concentrated sulfuric acid present in amounts of at least 5 parts by weight per part of 1-(para-nitrophenyl) ethyl nitrate, while maintaining the temperature between 0° C. and about 80° C., and thereafter quenching the reaction mixture and neutralizing the said reaction mixture to recover the para, beta-dinitrostyrene.

No references cited.